United States Patent [19]

Förster

[11] Patent Number: 4,880,603
[45] Date of Patent: Nov. 14, 1989

[54] DEVICE FOR ACHIEVING A UNIFORM DISTRIBUTION OF THE GAS FLOWING RADIALLY THROUGH A CATALYST BED

[75] Inventor: Friedrich Förster, Dortmund, Fed. Rep. of Germany

[73] Assignee: UHDE GmbH, Fed. Rep. of Germany

[21] Appl. No.: 154,524

[22] Filed: Feb. 8, 1988

Related U.S. Application Data

[63] Continuation of Ser. No. 718,487, Apr. 1, 1985, abandoned.

[30] Foreign Application Priority Data

Apr. 10, 1984 [DE] Fed. Rep. of Germany ....... 3413421

[51] Int. Cl.$^4$ ............................ B01J 8/02; B01J 8/04
[52] U.S. Cl. ................. 422/218; 48/196 A; 55/74; 55/98; 422/148; 423/360; 423/361; 423/DIG. 13
[58] Field of Search ............... 422/148, 218; 423/360, 423/361, DIG. 13; 48/196 A; 55/74, 98

[56] References Cited

U.S. PATENT DOCUMENTS

| | | | |
|---|---|---|---|
| 2,516,934 | 8/1950 | Weaver | 422/239 |
| 3,754,078 | 8/1973 | Hinrichs et al. | 422/148 X |
| 4,181,701 | 1/1980 | Topsoe et al. | 422/191 X |
| 4,346,060 | 8/1982 | Eagle et al. | 422/218 X |
| 4,372,920 | 2/1983 | Zardi | 422/148 |
| 4,405,562 | 9/1983 | Zardi et al. | 422/192 X |

FOREIGN PATENT DOCUMENTS

| | | |
|---|---|---|
| 1914246 | 9/1970 | Fed. Rep. of Germany ...... 422/148 |
| 2019706 | 10/1973 | Fed. Rep. of Germany . |
| 1542499 | 11/1975 | Fed. Rep. of Germany . |

Primary Examiner—Barry S. Richman
Assistant Examiner—Jill Johnston
Attorney, Agent, or Firm—Marshall & Melhorn

[57] ABSTRACT

The invention relates to a reactor for industrial plants, e.g. for an ammonia synthesis plant, comprising several catalyst beds in series charged by a radial gas flow. The object is to provide for a uniform gas flow through the catalyst bed along its entire height, otherwise different space velocities are experienced within the catalyst bed involving irregularities in the reaction. The problem is solved when the cross-section of the annular space for the effluent reaction gas flowing in axial direction is equal to or larger than the cross-section of the annular space for the influent fresh gas flowing in axial direction.

8 Claims, 1 Drawing Sheet

DEVICE FOR ACHIEVING A UNIFORM DISTRIBUTION OF THE GAS FLOWING RADIALLY THROUGH A CATALYST BED

This is a continuation of U.S. application Ser. No. 06/718,487, filed 4/1/85 now abandoned.

BACKGROUND OF THE INVENTION

The invention relates to a device for achieving a uniform distribution of the gas flowing radially through a catalyst bed in a reactor for catalytic reactions. The device comprises an annular catalyst basket with gas-permeable cylindrical walls, a gastight bottom, and a gastight cover. The catalyst basket is arranged in an annular vessel having a gastight bottom, an outer wall and a shorter inner wall so as to obtain an outer annular space for the influence of fresh gas and an inner annular space for the effluent reaction gas which passes over the shorter inner wall. Catalyst beds for such radial gas flow are specifically suitable for reactors in industrial plants, e.g. ammonia synthesis plants, because due to the low pressure drops, substantial energy can be saved in process gas recycling.

Such catalyst beds require a uniform gas flow across their entire height. Otherwise, different velocities of gas flow will occur involving irregularities in the reaction.

According to German Pat. 15 42 499, a design was proposed for the gas inlet wall which would induce a pressure drop by using two parallel faces provided with a multitude of different openings.

The design of the gas inlet wall for the catalyst bed, as suggested in the German Pat. 15 42 499, was such that by arranging for two parallel faces being provided with a multitude of different openings, a pressure drop was achieved which was substantially superior to that across the catalyst bed. In this case, provision was made for a multitude of holes to serve as restriction orifices.

According to German Pat. 20 19 706, the design for achieving a uniform gas distribution in catalysts through which the gas flows radially from the center toward the periphery graduates the cross-sections of the gas passage openings in the inner gas distribution pipe as a function of the height of the catalyst bed. The openings in the outer cylindrical plates of the catalyst basket are uniformly distributed over the entire plate and have an area being at least as large as the area of the openings in the first fourth of the inner cylindrical plate of the catalyst basket. In this case, a uniform distribution of the gas over the entire height of the catalyst bed is not obtained by an increased pressure drop across restriction orifices, but by a special arrangement of openings of different cross-sections.

SUMMARY OF THE INVENTION

The object of the invention is to eliminate the disadvantages of devices hitherto used for radial gas flow through catalyst beds.

According to this invention, the problem is solved by the fact that the cross-sectional area of the annular space for the effluent reaction gas flowing in axial direction is equal to or larger than the cross-sectional area of the annular space for the influent fresh gas flowing in axial direction.

According to a preferred embodiment of the invention, the cross-section ratio of the two annular spaces is 1.0 to 1.2.

The particular advantages of the present invention are that the provision of annular spaces, as proposed in this invention for the influent and effluent gas flow, makes the addition of further mechanical components unnecessary. A uniform radial influent and effluent gas flow is reached along the entire height of the catalyst bed. The regular gas distribution within the catalyst bed involves a uniform space velocity and thus a uniform reaction on the catalyst.

BRIEF DESCRIPTION OF THE DRAWINGS

The above as well as other objectives of the invention will become readily apparent to those skilled in the art from reading the following detailed description of a preferred embodiment of the invention when considered in the light of the accompanying drawings, in which.

DETAILED DESCRIPTION OF THE PREFERRED EMBODIMENT

Figure 1:
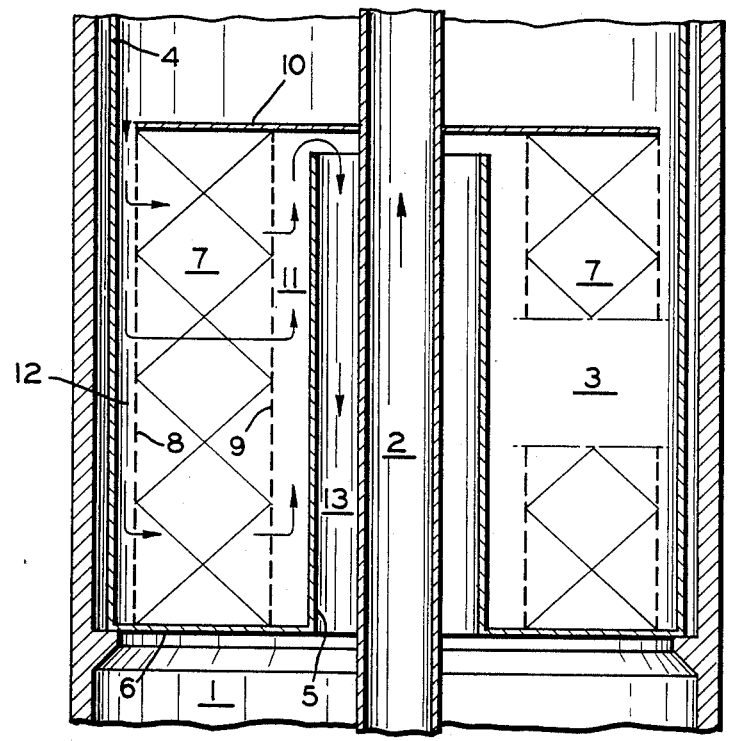
FIG. 1 is a fragmentary sectional view of a reactor with catalyst basket employing the features of the invention for effecting a particular pattern of gas flow.

A reactor generally indicated by reference numeral 1 illustrated in FIG. 1 is provided with a central gas tube 2 and accommodates an annular vessel 3 having a gastight outer wall 4, a shorter gastight inner wall 5, and a gastight bottom 6. The annular vessel 3 contains a catalyst basket 7 formd with gas-permeable walls 8 and 9 and a gastight cover 10 which extends radially outward from the central gas tube 2. The catalyst basket 7 is arranged in the annular vessel 3 so as to obtain an inner annular zone 11 for the effluent reaction gas. The cross-section of the zone 11 is at least as large, and preferably somewhat larger than the cross-section of an outer annular zone 12, generally defined by the outer wall 8 of the basket 7 and the wall 4 of the reactor for the influent fresh gas. This configuration is adapted to ensure for a uniform gas flow through the catalyst bed disposed in the catalyst basket 7 along the entire height thereof resulting in a uniform catalytic reaction and thus in the desired conversion. The inner wall 5 and the tube 2 define an annular exit zone 13 for the effluent reacting gas to flow out of the annular vessel 3.

Figure 2:
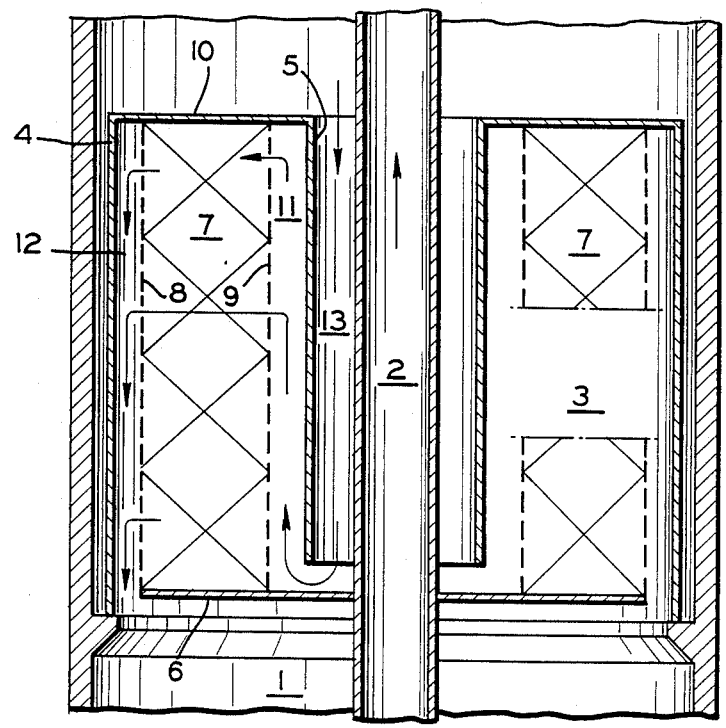
FIG. 2 is a fragmentary and sectional view of a reactor similar to the reactor of FIG. 1 employing the features of the invention for effecting a different pattern of gas flow.

FIG. 2 illustrates the design required for an inverse arrangement of the annular vessel 3 for accommodating the catalyst basket 7 in reactor 1. It is important to note that the ratio of the cross-sectional areas of the annular spaces 11 and 12 is as indicated in the invention because otherwise the distribution of the fresh gas in the catalyst bed contained within the catalyst basket 7 will not be uniform.

A reactor embodying the features of the invention is not only used for catalytic reactions in ammonia synthesis plants, but is preferably suitable for reactors in which a radial gas flow takes place through single or multiple catalyst beds.

It has been found that satisfactory results have been obtained by utilizing a reactor having the following properties under the following conditions:

EXAMPLE 1

A low-pressure ammonia synthesis reactor for a production of 1000 tons/day of $NH_3$ at an operating pressure of 106 bar contains, in the first catalyst bed being equipped with a central heat exchanger, a gas-permeable cylindrical outer and inner wall, said walls of the catalyst basket 7 retaining the catalyst bed and having the following dimensions:

Outside diameter of the outer gas permeable wall 8: 3350 mm

Inside diameter of the inner gas-permeable wall 9: 2000 mm

The distance between the outside diameter of the outer gas-permeable wall 8 and the inside diameter of the surrounding gas-impermeable wall 4 is 60 mm. Thus, the cross-section of this outer annular space 12 for achieving a radial gas flow through the catalyst bed from the periphery toward the center synthesis gas is fed from the top in axial direction, amounts to $F_1 = 0.643 \ m^2$ and the axial velocity of the synthesis gas at the inlet of the outer annular space is 4.83 m/s.

According to the invention, the cross-sectional area of the inner annular space for the effluent gas flowing in axial direction must at least be equal or larger than the cross-sectional area of the annular space for the influent fresh gas flowing in axial direction, the ratio being preferably 1.0 to 1.20. Thus, the distance between the inside diameter of the inner gas-permeable wall 9 and the outside diameter of the inner gas-impermeable wall 5 will be between 108 and 128 mm, e.g. 113 mm.

EXAMPLE 2

The last catalyst bed of the reactor as in Example 1 is not equipped with a central heat exchanger. The dimensions of the two gas-permeable cylindrical walls are in this case:

Outside diameter of the outer gas-permeable wall 8: 3350 mm

Inside diameter of the inner gas-permeable wall 9: 1200 mm

The cross-section of the outer annular space for the influent gas flowing in axial direction is equal to that in the first catalyst bed, viz 60 mm between the outer gas-imperable wall 8 and the outer gas-permeable wall 4.

According to the invention, the distance between the inside diameter of the inner gas-permeable wall 9 and the outside diameter of the inner gas-impermeable wall 5 will be between 206 and 233 mm for the third catalyst bed, e.g. 211 mm.

What I claim is:

1. A device for achieving a uniform distribution of the gas flowing radially through a catalyst bed in a reactor for catalytic reactions comprising:

an annular catalyst basket having gas-permeable inner and outer cylindrical walls each having a plurality of predetermined diameter, uniformly distributed apertures formed therein, and a gastight cover;

an annular vessel having gastight inner and outer cylindrical walls, and a gastight bottom, said basket being positioned in said vessel between said inner and outer walls of said vessel, said vessel outer wall and said basket outer wall forming a first annular space, said vessel inner wall and said basket inner wall forming a second annular space; and means for providing influent fresh gas in a first axial direction to said first annular space and means for receiving effluent reaction gas in a second opposite axial direction from said second annular space and wherein the cross-sectional area of said second annular space for the effluent reaction gas is equal to or larger than the cross-sectional area of said first annular space.

2. The invention defined in claim 1 wherein the ratio of cross-sectional areas of the annular spaces for the effluent reaction gas and the influent fresh gas is in the range 1.0 to 1.2.

3. A device for achieving a uniform distribution of the gas flowing radially through a catalyst bed in a reactor for catalytic reactions comprising:

an annular catalyst basket having gas-permeable inner and outer cylindrical walls each having a plurality of predetermined diameter, uniformly distributed apertures formed therein, and a gastight cover;

an annular vessel having gastight inner and outer cylindrical walls, and a gastight bottom, said basket being positioned in said vessel between said inner and outer walls of said vessel, said vessel outer wall and said basket outer wall forming a first annular space, said vessel inner wall and said basket inner wall forming a second annular space; and means for providing influent fresh gas in a first axial direction to said second annular space and means for receiving effluent reaction gas in a second opposite axial direction from said first annular space wherein the cross-sectional area of said first annular space for the effluent reaction gas is equal to or larger than the cross-sectional area of said second annular space.

4. The invention defined in claim 3 wherein the ratio of cross-sectional areas of the annular spaces for the effluent reaction gas and the influent fresh gas is in the range 1.0 to 1.2

5. A device for achieving a uniform distribution of the gas flowing radially through a catalyst bed in a reactor for catalytic reactions comprising:

an annular catalyst basket having gas-permeable inner and outer cylindrical walls each having a plurality of predetermined diameter, uniformly distributed apertures formed threin, and a gastight cover;

an annular vessel having gastight inner and outer cylindrical walls, and a gastight bottom, said basket being positioned in said vessel between said inner and outer walls of said vessel, said vessel outer wall and said basket outer wall forming a first annular space, said vessel inner wall and said basket inner wall forming a second annular space, said vessel inner wall being shorter than said vessel outer wall; and means for providing influent fresh gas in a first axial direction to one of said first and second annular spaces and means for receiving effluent reaction gas in a second opposite axial direction from the other one of said first and second annular spaces wherein a gas flow path extends radially through said catalyst basket and over said shorter vessel inner wall, and the cross-sectional area of said other one of said first and second annular spaces for the effluent reaction gas is equal to or larger than the cross-sectional area of said one of said first and second annular spaces for the influent fresh gas.

6. The invention defined in claim 5 wherein the ratio of cross-sectional areas of the annular spaces for the effluent reaction gas and the influent fresh gas is in the range 1.0 to 1.2

7. The invention defined in claim 5 wherein said means for providing influent fresh gas is connected to said first annular space and said means for receiving effluent reaction gas is connected to said second annular space.

8. The invention defined in claim 5 wherein said means for providing influent fresh gas is connected to said second annular space and said means for receiving effluent reaction gas is connected to said first annular space.

* * * * *